United States Patent [19]

Johnson

[11] Patent Number: 4,572,567

[45] Date of Patent: Feb. 25, 1986

[54] SNUBBING APPARATUS FOR GRAPPLES AND THE LIKE

[75] Inventor: Thomas E. Johnson, Woodstock, Canada

[73] Assignee: Timberjack Inc., Woodstock, Canada

[21] Appl. No.: 604,243

[22] Filed: Apr. 26, 1984

[51] Int. Cl.4 ............................ B66C 1/00; F16F 7/06

[52] U.S. Cl. .................................. 294/119.4; 188/74; 188/78; 188/83; 188/343

[58] Field of Search ................ 294/70, 86 R, 88, 106; 37/183 R; 188/70 R, 74, 78, 83, 130, 306, 343; 384/264-267, 272, 274; 403/31, 113, 120, 146, 15, 157; 414/626, 732-735, 738-740

[56] References Cited

U.S. PATENT DOCUMENTS

| | | | |
|---|---|---|---|
| 3,009,747 | 11/1961 | Pitzer | 188/83 X |
| 3,301,587 | 1/1967 | Heikkinen | 294/86 R X |
| 3,420,548 | 1/1969 | Wakeman | 188/306 X |
| 3,592,503 | 7/1971 | Lundberg | 294/86 R |
| 4,099,761 | 7/1978 | Cullings | 294/86 R |
| 4,425,050 | 1/1984 | Durand | 403/15 |

*Primary Examiner*—Johnny D. Cherry
*Attorney, Agent, or Firm*—Ridout & Maybee

[57] ABSTRACT

A snubbing device for a suspended grapple or the like operable by pressurized fluid in a cavity between a pin and housing of a universal joint which actuates a ramp to cause a retarding reaction between the pin and housing to prevent free swinging of the grapple.

9 Claims, 3 Drawing Figures

SNUBBING APPARATUS FOR GRAPPLES AND THE LIKE

This invention relates to a snubbing apparatus for the pivotable or swivel mounted support of well-known grapple mechanisms, clam shells, and the like, used for handling loads.

Heretofore, grapple mechanisms were allowed to oscillate freely at the end of a boom assembly of a skidder or construction machine which is undesirable since the load may be long enough, such as pulpwood loads, to damage the machine or the free oscillation of the load makes it difficult to spot the load or the grapple mechanism or the like (see U.S. Pat. Nos. 3,582,127 to Johnson and 3,594,034 to Rowell). Snubbers for grapple mechanisms are known in the art, see U.S. Pat. Nos. 3,592,503 to Lundberg and 3,513,998 to Stone, but such snubbers are costly to manufacture and maintain.

Accordingly, one object of the present invention is to provide a snubber or retarding apparatus for a swivel or universal mounted grapple or the like suspended from the free end of a boom end assembly that is inexpensive to manufacture, requires no adjustment, and is readily maintained.

Another object of the invention is to provide a snubbing apparatus located in a cavity between a pin and housing of the swivel or universal joint which is pressurized via a grease pin fitting.

Another object of the invention is to provide a snubber for a grapple mechanism or the like suspended from the free end of a boom operable by the pressurized fluid in a cavity between the pin and housing of the swivel or universal joint causing a radial reaction between the pin and housing.

Other objects of this invention will become apparent from the following description and accompanying drawings wherein.

Figure 1:
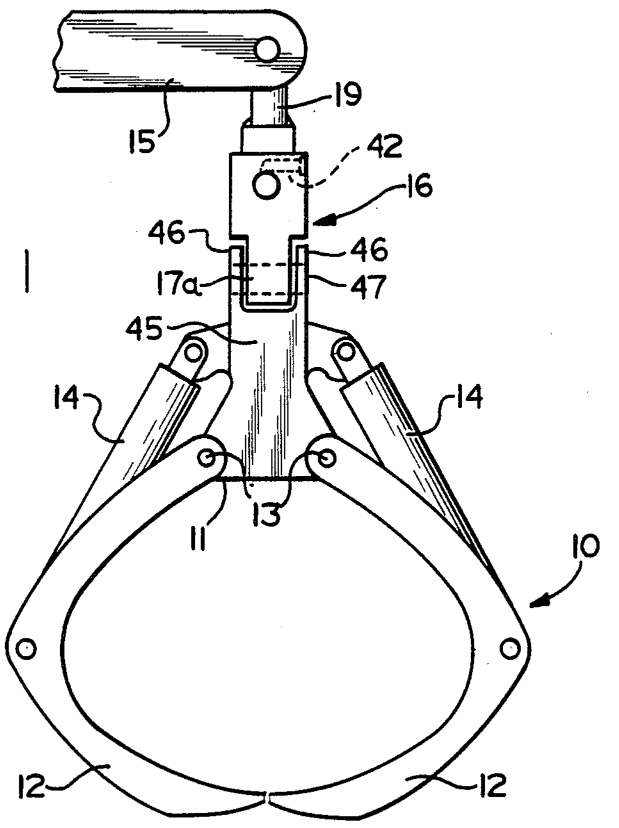
FIG. 1 is a side elevational view illustrating the invention in conjunction with a typical grapple mechanism that is suspended from the free end of a boom which is depicted only fragmentarily.

Referring to FIG. 1 of the drawings, a conventional grapple mechanism shown in this Fig. has been denoted generally by the reference numeral 10. The grapple mechanism 10 includes a frame or head 11, a pair of operable jaws 12 pivotably mounted to the head on pins 13. Hydraulic motors (14) in the form of two rams actuate the jaws into open and closed positions about the pivot pins 13. Although this invention is shown and described as applying to a grapple mechanism 10 it is also obvious that the invention can be employed with other mechanisms such as clam buckets, and the like.

The grapple mechanism 10 is suspended from the free end 15 of a boom mounted on a skidder or other machine which is not shown. The grapple 10 is connected to the boom 15 by means of a swivel or universal joint unit embodying my invention which has been denoted generally by reference numeral 16.

The universal joint 16 comprises a tubular housing 17 welded as at 18 to the member 19 attached to the boom 15. The pin 20 passes through the tubular housing 17 and pivotably supports the arms 21 and 22 of the upper yoke 23. The pin 20 has a washer 24 welded at one end and a bolt 25 passing through the pin at the other end and through spaced aligned lugs 26 secured to the arm 22 to prevent the pin 20 from either rotating or moving axially relative to the arms 21 and 22.

Figure 3:
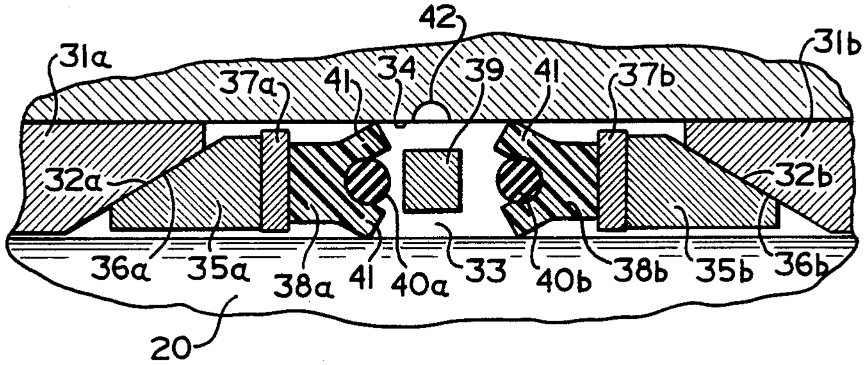
FIG. 3 is an enlarged fragmentary view similar to FIG. 2.

In accordance with this invention, a pair of bearings or bushings 27 and 28 are positioned within the bore 29 of the housing 17 and are prevented from moving axially by the snap-rings 30. As shown in FIG. 3, the inner ends 31*a* and 31*b* of the bushings are cambered or inclined at an acute angle of approximately 40 degrees relative to the axis of the pin 20 to form inclined ramp faces 32*a* and 32*b*. A cavity 33 is defined by the inclined faces 32*a* and 32*b*, the pin 20 and the central annular surface 34 of the bore. A pair of rings 35*a* and 35*b* are positioned within the cavity 33 each of which has an inclined surface 36*a* and 36*b*. The surfaces 36*a* and 36*b* are substantially parallel to the inclined ramp faces 32*a* and 32*b* of the bushings 27 and 28. Preferably the rings 35*a* and 35*b* are made of bronze or other similar metal. A pair of washer shaped members 37*a* and 37*b* bear against the radially extending ends of the rings 35*a* and 35*b*. A pair of plastic lip type seals 38*a* and 38*b* are positioned between each of the members 37*a*, 37*b* and a spacer ring 39 which is positioned between the seals 38*a* and 38*b*.

Each of the seals 38*a*, 38*b* consists of a high durometer lip type seal element made of plastic which is activated by an O-ring 40*a* and 40*b* wedged or clamped in a groove in each of the seals 38*a*, 38*b*. The seals 38*a*, 38*b* preferably are of the type sold under the trademark PARKER Poly Pack owned by Parker Hannifin Corp. The O-rings 40*a*, 40*b* contact the surfaces of the bore 29 or the pin 20 but force the lips 41 of the seals outwardly to form a positive leak free seal against the surface of the bore 29 and pin 20 respectively as shown in FIG. 3. The portion of the cavity 33 between the lips 41 is pressurized by grease injected therein through bore 42 extending through the housing 17 transversely of the pin 20 and terminating in a grease gun fitting 43 having a check valve as shown in the lower portion of FIG. 1.

Figure 2:
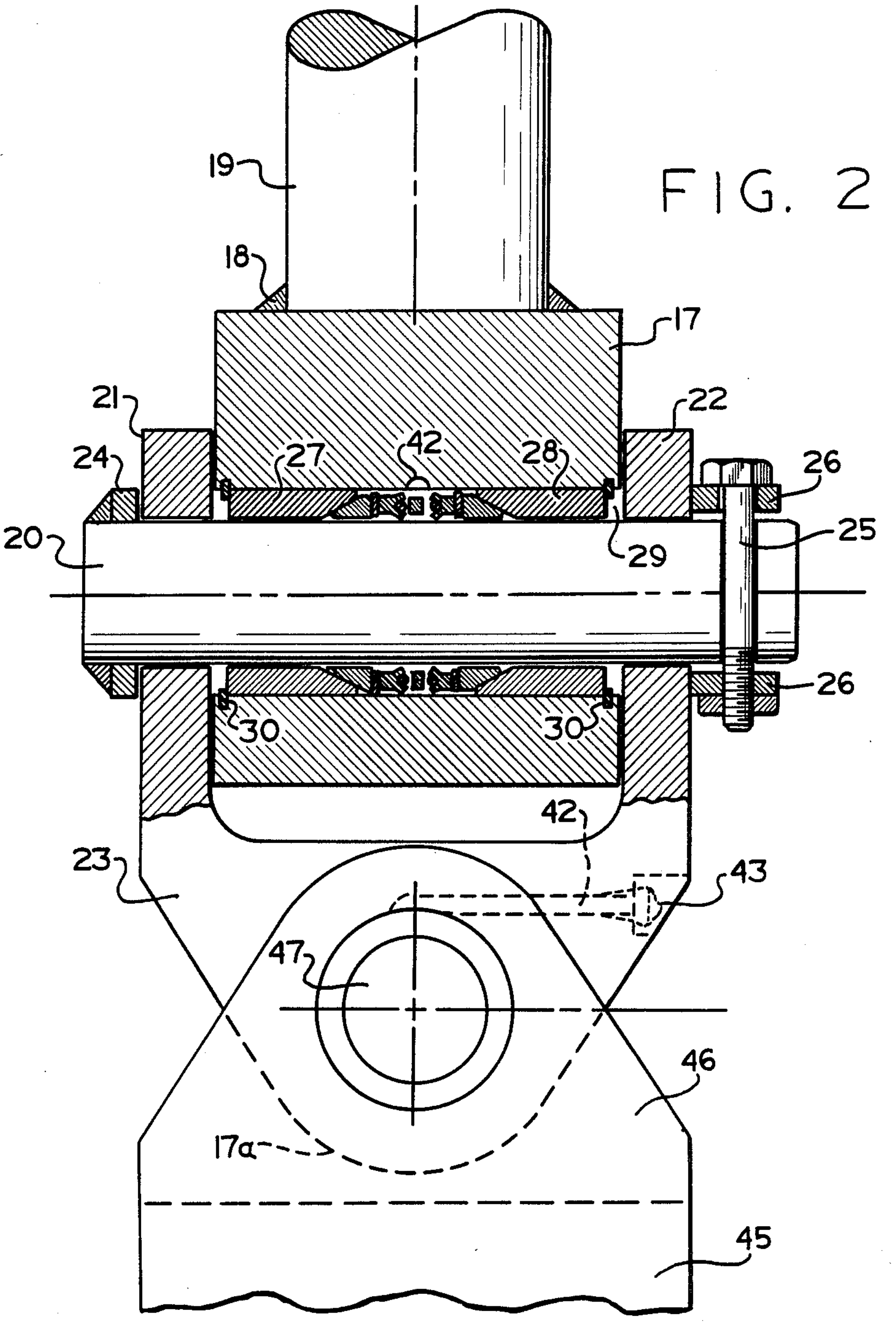
FIG. 2 is a sectional view taken in the directional lines 2—2 of FIG. 1.

The lower yoke 45 is connected to the grapple mechanism 10 and as shown in FIG. 2. The arms 46 of the lower yoke 45 are mounted to pivot about the axis of a lower pin 47 which is fixed to the arms 46 in a manner similar to that shown with respect to the upper pin 20. The upper yoke 23 has a lower housing 17*a* therein similar to upper housing 17 as well as a snubber mechanism of a construction similar to that shown in the upper housing 17, which, of course, is pressurized by grease through the bore 42.

In operation, when pressure is applied by use of a grease gun typically used to lubricate the pins 20 and 47 a snubbing or braking effort on the pivoting structure is created. As pressure is applied through the bore 42 the seal lips 41 are initially moved radially to increase the frictional drag between the seal lips 41 and the adjacent surface 34 of the bore 29 and the surface of the pin 20. At the same time, the seals 38*a*, 38*b* are moved slightly axially in opposite directions and away from each other, causing the members 37*a*, 37*b* and the rings 35*a* and 35*b* to also move axially. As the rings 35*a*, 35*b* move axially away from each other, the inclined surfaces 36*a* and 36*b* thereof move relative to the respective ramp faces 32*a* and 32*b* of the bearing ends 31*a*, 31*b*. This movement causes a wedging action between incline surfaces 36*a* and 36*b* of the rings 35*a*, 35*b* and the ramp faces 32*a* and 32*b* which causes the inner ends 31*a* and 31*b* of bearings 27 and 28 to move slightly radially into tighter engagement with the surface of the bore 29 and also causes the rings 35*a*, 35*b* to move radially inwardly into tighter engagement with the pin 20. Thus, the frictional drag or retarding force between the pin 20 and the housing 17 is increased. The retarding force is essentially proportional to the amount of grease pressure applied so that the dampening or snubbing may be adjustable. Since the grease pressure is sealed in the cavity 33 between the seals by the check valve in the grease fitting 43, the pressure will remain essentially constant and decrease only in proportion to the amount of grease that may bypass the seals 38*a*, 38*b*.

I claim:

1. An apparatus for pivotably suspending a load including a snubber for controlling or dampening oscillation of the load comprising:

a pin and housing assembly, a bore in said housing through which said pin extends, means for suspending a load from said pin, bearing means positioned in said bore between said pin and bore forming a cavity between the bore of said housing and the pin, annular seal means in said cavity, means for pressurizing the cavity, and a snubber means positioned in said cavity actuated upon pressurization of said cavity, said seal means impinges upon said snubber means so as to cause a frictional drag between the pin and housing to thereby dampen pivotal movement between the pin and housing.

2. An apparatus as claimed in claim 1 in which said bearing means comprises a pair of axially spaced annular bearings.

3. An apparatus as claimed in claim 2 in which said seal means comprise a pair of axially spaced seals.

4. An apparatus as claimed in claim 3 in which said snubber means comprises at least one pair of inclined surfaces, said inclined surfaces coacting upon pressurization of said cavity to move radially to increase friction drag on said pin and bore.

5. An apparatus as claimed in claim 3 in which said pair of seals are loacted between said bearing means.

6. An apparatus as claimed in claim 5 in which said snubber means includes two pairs of inclined surfaces.

7. An apparatus as claimed in claim 6 in which said pair of seals is located between said pairs of inclined surfaces.

8. An apparatus as claimed in claim 7 in which said cavity is pressurized through a bore terminating in an opening located between said seal means, through which lubricant is supplied to said cavity.

9. An apparatus as claimed in claim 7 in which a spacer means is located between said pair of seals.

* * * * *